(12) United States Patent
Binder et al.

(10) Patent No.: US 8,377,561 B2
(45) Date of Patent: Feb. 19, 2013

(54) MOTOR VEHICLE COMPONENT COMPRISING SOL-GEL COATING

(75) Inventors: Hans Binder, Böhmenkirch (DE); Ottmar Binder, Böhmenkirch (DE)

(73) Assignee: Suddeutsche Aluminium Manufaktur GmbH, Bohmenkirch (DE)

( * ) Notice: Subject to any disclaimer, the term of this patent is extended or adjusted under 35 U.S.C. 154(b) by 901 days.

(21) Appl. No.: 12/075,559

(22) Filed: Mar. 12, 2008

(65) Prior Publication Data

US 2008/0261033 A1 Oct. 23, 2008

(30) Foreign Application Priority Data

Mar. 16, 2007 (DE) .......................... 10 2007 014 444
Feb. 27, 2008 (DE) .......................... 10 2008 011 296

(51) Int. Cl.
*B32B 27/32* (2006.01)
*B32B 9/04* (2006.01)
*B32B 15/04* (2006.01)

(52) U.S. Cl. ........ 428/450; 428/220; 428/332; 428/447; 428/457

(58) Field of Classification Search .................. None
See application file for complete search history.

(56) References Cited

U.S. PATENT DOCUMENTS

| | | | |
|---|---|---|---|
| 5,091,609 A | 2/1992 | Sawada et al. | |
| 5,904,989 A | 5/1999 | Hänggi et al. | |
| 6,685,816 B1 | 2/2004 | Brattinga et al. | |
| 6,821,305 B2 * | 11/2004 | Yan .................................. | 8/522 |
| 2003/0111455 A1 | 6/2003 | Krings et al. | |
| 2003/0138661 A1 | 7/2003 | Souchard et al. | |
| 2004/0004003 A1 | 1/2004 | Hesse | |
| 2004/0009344 A1 * | 1/2004 | Krienke et al. ............... | 428/328 |
| 2004/0129574 A1 * | 7/2004 | Kia et al. ....................... | 205/213 |
| 2004/0233530 A1 * | 11/2004 | Kramer et al. ................ | 359/507 |
| 2005/0129959 A1 * | 6/2005 | Roemer-Scheuermann et al. .............................. | 428/426 |
| 2006/0070881 A1 | 4/2006 | Takada | |

FOREIGN PATENT DOCUMENTS

| | | |
|---|---|---|
| DE | 100 27 265 A1 | 12/2001 |
| EP | 0 410 003 A1 | 1/1991 |
| EP | 0 802 267 A1 | 10/1997 |
| EP | 1 154 289 A1 | 11/2001 |
| EP | 1457 267 A1 | 9/2004 |
| EP | 1 642 745 A2 | 4/2006 |
| EP | 1 785 748 A1 | 5/2007 |
| WO | 01/32965 A1 | 5/2001 |
| WO | 02/066727 A2 | 8/2002 |

OTHER PUBLICATIONS

Office Action and European Search Report in the parallel procedure EP 08 00 4258, Dec. 23, 2010.
Wang, Xiu-hua, et al., "Preparation and Characterization of Organic-Inorganic Hybrid Nanocompsites and Coatings", Journal of Functional Materials, 2004, vol. 35, (relevant pp. 2956, 2957 and 2962); with English Abstract.
First Office Action issued by the State Intellectual Property Office of the People's Republic of China in the parallel Chinese Application No. 200810086481.7, with English Translation, Jul. 16, 2010.
Wang, Xiu-hua, et al., "Preparation and Characterization of Organic-Inorganic Hybrid Nanocompsites and Coatings", Journal of Functional Materials, 2004, vol. 35, (relevant pp. 2956, 2957 and 2962); with complete English translation.

* cited by examiner

*Primary Examiner* — Sheeba Ahmed
(74) *Attorney, Agent, or Firm* — Harness, Dickey & Pierce, P.L.C.

(57) ABSTRACT

The invention relates to a motor vehicle component, particularly a motor vehicle attachment part, preferably a motor vehicle exterior component, particularly preferred a motor vehicle trim component, made of anodized aluminum or an anodized aluminum alloy. The motor vehicle component is provided—at least partially—with a sol-gel coating. The invention further relates to a motor vehicle comprising a corresponding motor vehicle component.

10 Claims, 1 Drawing Sheet

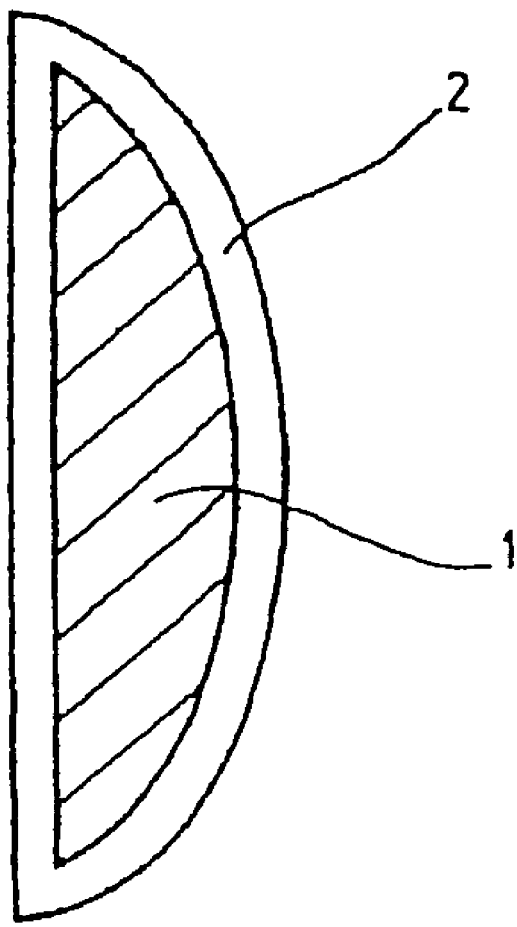

MOTOR VEHICLE COMPONENT COMPRISING SOL-GEL COATING

CROSS-REFERENCE TO RELATED APPLICATIONS

This application claims priority to German Patent Applications No. DE 10 2007 014 444.1, filed Mar. 16, 2007 and DE 10 2008 011 296.8, filed Feb. 27, 2008. The disclosures of the above applications are incorporated herein by reference.

FIELD

The present disclosure relates to a motor vehicle component, particularly a motor vehicle attachment part, preferably a motor vehicle exterior component, particularly preferred a motor vehicle trim component, made of anodized aluminum or an anodized aluminum alloy.

BACKGROUND

The statements in this section merely provide background information related to the present disclosure and may not constitute prior art.

Conventional motor vehicle components made of aluminum are brushed or anodized. These components are exposed to mechanical and chemical stress. Components of this type, for example, come in contact with cleaning agents when the motor vehicle is washed. If the cleaning agents used have corrosive effects, this results in a visible impairment of the surfaces of the motor vehicle components.

SUMMARY

It is therefore the object of the invention to create a motor vehicle component, whose surface has high resistance to ambient influences and other stresses, particularly acids, lyes, and solvents.

This object is achieved according to the invention in that the component is provided—at least partially—with a sol-gel coating, particularly after anodization. A sol-gel coating particularly shall be interpreted as a colloidal solution (sol) of inorganic, catalytic silicon oxide particles, wherein the solution is converted into a gel by gelation and used as a coating for especially an anodized motor vehicle component made of aluminum or an aluminum alloy. Consequently, the sol-gel coating forms a coating film on the motor vehicle component.

Due to the inventive sol-gel coating, the motor vehicle component, which is made of anodized aluminum or an anodized aluminum alloy, is provided with excellent inherent UV protection, which is to say it has high UV resistance. Furthermore, the surface is extremely resistant, particularly scratch-resistant, as a result of the coating.

According to a further development of the invention, it is provided that the sol-gel coating is a siliceous sol-gel coating.

Furthermore, it is advantageous to ensure that the sol-gel coating is also a hybrid coating made of organic and inorganic ingredients.

In particular, it is provided that the ingredients are additives. Depending on the organic and/or inorganic ingredients that are used, additional surface effects of the motor vehicle components can be varied such that, for example, an easy-to-clean surface all the way to a moisture-repelling surface (lotus effect) can be achieved.

Advantageously, the organic ingredients comprised additionally in the sol-gel coating and/or the organic ingredients comprised in the hybrid coating are substances of the following groups: phenyl groups and/or methacrylate groups.

Advantageously, the inorganic ingredients comprised additionally in the sol-gel coating and/or the inorganic ingredients comprised in the hybrid coating are substances of the following groups: PU silanes and/or EP silanes, wherein PU is polyurethane and EP is epoxy.

According to a further development of the invention, it is provided that the sol-gel coating has a thickness of 0.5 µm to 5 µm.

BRIEF DESCRIPTION OF THE VIEW OF THE DRAWING

The drawing described herein is for illustration purposes only and is not intended to limit the scope of the present disclosure in any way.

FIG. 1 is a cross-sectional view of a motor vehicle component in accordance with the present teachings.

DESCRIPTION OF VARIOUS ASPECTS

The following description is merely exemplary in nature and is not intended to limit the present disclosure, application, or uses.

The drawing illustrates the invention by way of an exemplary embodiment. The figure shows the cross-section of a motor vehicle component, for example a trim molding 1, which is made of aluminum. The surface of the trim molding 1 is anodized. Colorless or colored anodization may be provided. In particular, it is provided that a certain roughness of the surface is adjusted with the type and duration of the anodization step. After anodization, a sol-gel coating is applied to the trim molding 1 by spraying, cylindrical rolling, immersion, doctoring, and/or flat rolling and cured by means of a tempering process. The sol-gel coating 2 is incombustible and heat and fire resistant. In the event of a fire, no gases develop from the coating 2. The coating material preferably comprises exclusively inorganic components. Alternatively, however, it is also possible that organic components are present. A combination of organic and inorganic components is also conceivable.

Furthermore, the sol-gel coating advantageously is configured as a colorless, transparent sol-gel coating. Alternatively, it is also possible to add colored additives, particularly pigments, in order to achieve a colored configuration of the surface.

The invention further relates to a motor vehicle having a motor vehicle component, which comprises a sol-gel coating according to the above description. The motor vehicle attachment, for example, is a window shaft cover, a roof rail, or a trim molding of a motor vehicle, wherein the motor vehicle component is made of aluminum or an aluminum alloy. The surface of the motor vehicle component is anodized. The motor vehicle component is provided, at least partially, with a sol-gel coating, particularly from the outside. As a result of this coating, the component has high chemical resistance to most acids, lyes, and solvents. The sol-gel coating has a closed-pored surface and is not only resistant to corrosion, weathering, and light, but additionally may also be characterized by additional features, such as particularly high dirt repellent and easy-to-clean properties. It is also possible to implement the sol-gel coating as a glossy or matt coating. A satin effect is also possible.

According to a preferred example, the motor vehicle is provided with a sol-gel coating by immersion. Alternatively, and as a function of the coated component geometry, it is also possible to spray on the sol-gel coating or apply the sol-gel coating by cylindrical rolling. This type of application achieves a particularly constant layer thickness.

Furthermore it is advantageous to apply the sol-gel coating in a thickness of 0.5 μm to 5 μm, so that only relatively little coating material is required and at the same time the above-mentioned excellent results are achieved.

Further areas of applicability will become apparent from the description provided herein. It should be understood that the description and specific examples are intended for purposes of illustration only and are not intended to limit the scope of the present disclosure.

What is claimed is:

1. A motor vehicle component made of a material having a surface, the material selected from the group consisting of a colored anodized aluminum and a colored anodized aluminum alloy, the component being at least partially provided with a sol-gel coating on the material, wherein the sol-gel coating is a color coating obtained by adding pigments that add a color configuration to the surface, wherein the sol-gel coating is a hybrid coating including organic and inorganic ingredients, and wherein the organic ingredients are substances of phenyl groups and the inorganic ingredients are polyurethane silanes.

2. The motor vehicle component according to claim 1, wherein the sol-gel coating is a siliceous sol-gel coating.

3. The motor vehicle component according to claim 1, wherein the sol-gel coating has a thickness of approximately 0.5 μm to 5 μm.

4. The component of claim 1 in combination with a motor vehicle.

5. The motor vehicle component of claim 1, wherein the component is a motor vehicle attachment.

6. The motor vehicle component of claim 1, wherein the component is a motor vehicle trim component.

7. A motor vehicle component comprising:
  a material having a surface, the material selected from the group consisting of a colored anodized aluminum and a colored anodized aluminum alloy; and
  a sol-gel coating on the material, the sol-gel coating being a color coating obtained by adding pigments for adding a color configuration to the surface;
  wherein the sol-gel coating is a hybrid coating including organic and inorganic ingredients, and wherein the organic ingredients are substances of phenyl groups and the inorganic ingredients are polyurethane silanes.

8. The motor vehicle component according to claim 7, wherein the sol-gel coating has a thickness of approximately 0.5 μm to 5 μm.

9. The motor vehicle component of claim 1, wherein the sol-gel coating has a thickness of 1 μm to 5 μm.

10. The motor vehicle component of claim 7, wherein the sol-gel coating has a thickness of 1 μm to 5 μm.

* * * * *